(12) United States Patent
Yong et al.

(10) Patent No.: US 10,450,529 B2
(45) Date of Patent: Oct. 22, 2019

(54) METHOD FOR SIMULTANEOUSLY AND STABLY DISPERSING SPHERICAL NANOPARTICLES IN OIL MEDIUM BY USING LAYERED NANOSHEETS AND APPLICATION THEREOF

(71) Applicant: SOUTH UNIVERSITY OF SCIENCE AND TECHNOLOGY OF CHINA, Shenzhen (CN)

(72) Inventors: Huaisong Yong, Shenzhen (CN); Dazhi Sun, Shenzhen (CN)

(73) Assignee: SOUTH UNIVERSITY OF SCIENCE AND TECHNOLOGY OF CHINA, Shenzhen (CN)

( * ) Notice: Subject to any disclaimer, the term of this patent is extended or adjusted under 35 U.S.C. 154(b) by 0 days.

(21) Appl. No.: 15/310,828

(22) PCT Filed: Sep. 23, 2014

(86) PCT No.: PCT/CN2014/087213
§ 371 (c)(1),
(2) Date: Nov. 14, 2016

(87) PCT Pub. No.: WO2016/019618
PCT Pub. Date: Feb. 11, 2016

(65) Prior Publication Data
US 2017/0145338 A1 May 25, 2017

(30) Foreign Application Priority Data
Aug. 5, 2014 (CN) .......................... 2014 1 0382805

(51) Int. Cl.
*C10M 141/06* (2006.01)
*C10M 171/00* (2006.01)
*C10M 141/08* (2006.01)
*C10M 161/00* (2006.01)
*C10M 177/00* (2006.01)
*B01F 17/00* (2006.01)

(52) U.S. Cl.
CPC ....... *C10M 141/06* (2013.01); *B01F 17/0007* (2013.01); *C10M 161/00* (2013.01); *C10M 177/00* (2013.01); *C10M 2201/05* (2013.01); *C10M 2201/085* (2013.01)

(58) Field of Classification Search
CPC .......................... C10M 133/02; C10M 113/08
USPC ......................... 508/150, 151, 153
See application file for complete search history.

(56) References Cited

U.S. PATENT DOCUMENTS

| 4,089,792 A * | 5/1978 | Lowe | ........................ C10M 1/08 |
| | | | 252/400.21 |
| 2008/0161213 A1 * | 7/2008 | Jao | ........................ B82Y 30/00 |
| | | | 508/165 |

(Continued)

*Primary Examiner* — Prem C Singh
*Assistant Examiner* — Francis C Campanell
(74) *Attorney, Agent, or Firm* — Hodgson Russ LLP

(57) ABSTRACT

Provided are a method for simultaneously and stably dispersing spherical nanoparticles in an oil medium by using layered nanosheets and an application thereof. The method comprises: (1) mixing the layered nanosheets and oil-soluble alkylamines to obtain a first mixture containing intercalated/exfoliated nano sheets; (2) mixing spherical nanoparticles and the oil medium to obtain a second mixture; and (3) mixing the first mixture, the second mixture and the oil medium to obtain a third mixture.

19 Claims, 10 Drawing Sheets

(56) References Cited

U.S. PATENT DOCUMENTS

2008/0312111 A1* 12/2008 Malshe ................ C10M 171/06
 508/155
2014/0011719 A1* 1/2014 Haque .................. C10M 125/24
 508/162

* cited by examiner test time

METHOD FOR SIMULTANEOUSLY AND STABLY DISPERSING SPHERICAL NANOPARTICLES IN OIL MEDIUM BY USING LAYERED NANOSHEETS AND APPLICATION THEREOF

CROSS-REFERENCE TO RELATED APPLICATIONS

The present application is a national phase entry under 35 USC § 371 of International Application No. PCT/CN2014/087213, filed Sep. 23, 2014, which claims the benefit of and priority to Chinese Patent Application No. 201410382805.7, filed Aug. 5, 2014, the entire disclosures of which are incorporated herein by reference.

FIELD

The present disclosure relates to the material field, in particularly to a method for simultaneously and stably dispersing spherical nanoparticles in an oil medium by using layered nanosheets and an application thereof, more particularly to the method for simultaneously and stably dispersing spherical nanoparticles in the oil medium by using layered nanosheets, an oil blend containing both layered nanosheets and spherical nanoparticles and the use of the oil blend in the preparation of lubricating oils and lubricating greases.

BACKGROUND

With the continuous development of nanoscience and technology, nanomaterials are increasingly being applied into lubricating systems, thus emerging the research area of nano-lubricating additives. The most commonly used nano-lubricating additives may be divided into five types: (1) zero-dimensional (in a spherical or spherical-like shape) solid nanoparticles, such as silicon dioxide nanoparticles, metal nanoparticles, and metal oxide nanoparticles; (2) zero-dimensional (in a spherical or spherical-like shape) hollow nanoparticles, such as fullerene and its derivatives, and $WS_2/MoS_2$ hollow nanospheres; (3) one-dimensional nanoparticles, such as carbon nanotubes, $ZnS/WS_2/MoS_2$ metal sulfide nanorods, and Mo—S—I/$Mg_2B_2O_5$ nanowires; (4) two-dimensional layered nanoparticles, such as disulfide metal salts, clays, layered double hydroxides (LDHs), layered metal phosphates, graphite and its derivatives, and graphene and its derivatives; (5) other types of nanomaterials, such as inorganic-organic hybridized surfactants, represented by amphipathic polyoxometalate-organic hybrids.

Nanoparticles have advantages such as small particle size, large specific surface area and high surface energy, resulting in tendencies of agglomeration, aggregation and sedimentation in a solution. It has become one of main technical difficulties limiting the nanomaterials to be applied as the lubricating additives due to their poor dispersion stabilities in lubricating oils. In general, it is necessary to disperse inorganic nanoparticles in oils by means of modifying particles surfaces or adding dispersing agents, since the inorganic nanoparticles are hard to be dissolved in oil. For example, in a practical application, metal nanoparticles have oxygen-containing groups on their surface for further surface modification, such as hydroxyl and carboxyl, resulting from the inevitable exposure of air at their surfaces. In this case, in order to well disperse the metal nanoparticles in the oil medium, it is the most direct method to add oil-soluble surfactants, such as long chain hydrocarbyl carboxylic acids and long chain hydrocarbyl sulphonates. The surfactants allow for the dispersion of the metal nanoparticles in the oil medium by means of intermolecular dipole interactions, van der Waals force or electrostatic interactions with oxidized surfaces of the metal nanoparticles. However, these temporally dispersed metal nanoparticles by adding the surfactants are incapable of being stable in the oil medium for a long period, as the above-mentioned intermolecular dipole interactions, van der Waals forces and electrostatic interactions are weak, therefore aggregation and sedimentation eventually occur. Another commonly used method for dispersing metal nanoparticles is to add oil-soluble coordination compounds during synthesizing the metal nanoparticles. In specific, metal ion precursors are initially subjected to the coordination reaction with corresponding oil-soluble coordination compounds, and then the metal nanoparticles are synthesized by adding reducing agents. The metal nanoparticles obtained by this method are stable in the oil medium. However, this method is costly, which limits the application of the such-synthesized metal nanoparticles.

Another example is layered metal phosphate nanosheets, e.g., α-zirconium phosphate (α-ZrP, $Zr(HPO_4)_2 \cdot 2H_2O$) nanosheets, in which a layered structure is formed with the connection between oxygen atoms in the phosphate groups and the zirconium atoms. In specific, three of the oxygen atoms for each phosphate group are involved in formation of the layered structure, and the rest oxygen atom in the forms of a hydroxyl group extends towards the interlayer of the layered structure. As the hydroxyl group carried by α-ZrP tends to be partially deprotonated in an aqueous solution, α-ZrP is partially soluble in water, thus resulting in weak acidity in the aqueous solution. However, α-ZrP is insoluble and hard to disperse in the oil media, which leads to a key technical issue to be resolved when applying α-ZrP nanosheets in the lubricating oils. Nevertheless, there are few literatures so far reporting the possibility in properly resolving this issue. It is reported that nonionic surfactants containing oxyethylene groups may be capable of dispersing layered zirconium phosphate nanosheets treated by HP in both an aqueous solution and organic solutions. However, this method has disadvantages as described below. On one hand, HP used is very dangerous, and on the other hand, zirconium phosphate treated by HP will inevitably adsorb HF, which, as well known, badly erodes metallic materials due to hygroscopicity of α-ZrP. Accordingly, it is impossible to apply zirconium phosphate treated by HF to the lubricating oil. It has also been reported that it is safer to use polyamine-modified polyisobutylene succinimide (PIBSA-PAM) as the dispersing agent for dispersing α-ZrP nanosheets in the lubricating oil. However, it is impossible for this method to form a long-term stable emulsion after mixing PIBSA-PAM, α-ZrP and the lubricating oil, resulting in liquid phase separation inevitably. Accordingly, this static instability decreases effectiveness of the α-ZrP nanosheets and causes some problems when applying in practice.

Therefore, it still needs to further improve dispersion stability of nanomaterials in the oil medium.

SUMMARY

Embodiments of the present disclosure seek to solve at least one of the problems existing in the related art to at least some extent. Accordingly, an object of the present disclosure is to provide a method for dispersing and stabilizing nanoparticles in an oil medium using nanosheets, so as to obtain a method for simultaneously and stably dispersing both spherical nanoparticles and layered nanosheets in an oil medium effectively, which is universally applicable.

In the present disclosure, there is provided in embodiments a new method for simultaneously and stably dispersing spherical nanoparticles in an oil medium by using layered nanosheets. In some embodiments of the present disclosure, two-dimensional layered nanoparticles are firstly intercalated/exfoliated, and then spherical nanoparticles are dispersed and stabilized using intercalated/exfoliated nanosheets. It can be seen from the test results that the layered nanomaterials allow for well dispersing the spherical nanoparticles in the oil medium, thereby exhibiting excellent tribological properties.

In a first aspect of the present disclosure, there is provided a method for simultaneously and stably dispersing spherical nanoparticles in an oil medium by using layered nanosheets. In embodiments of the present disclosure, the method includes:

mixing the layered nanosheets and oil-soluble alkylamines to obtain a first mixture containing intercalated/exfoliated nanosheets;

mixing the spherical nanoparticles and the oil medium to obtain a second mixture; and mixing the first mixture, the second mixture and the oil medium to obtain a third mixture.

The inventors have found that the method according to embodiments of the present disclosure stabilizes spherical nanoparticles with layered nanosheets, so that both layered nanosheets and spherical nanoparticles can be simultaneously and stably dispersed in the oil medium, resulting in a solution or microemulsion exhibiting a good stability without sedimentation or phase separation. Such a method is easy and convenient to be operated.

In embodiments of the present disclosure, the layered nanosheets and the oil-soluble alkylamines are mixed by means of heat treatment, ultrasonic treatment or mechanical agitation. Thus, the layered nanosheets and the oil-soluble alkylamines are dispersed uniformly in a quick and effective manner.

In embodiments of the present disclosure, the layered nanosheets are at least one selected from α-zirconium phosphate, θ-zirconium phosphate, γ-zirconium phosphate, layered metal phosphates, clays, layered double hydroxides (LDHs), layered disulfide metal salts and layered tungsten acid metal salts.

In embodiments of the present disclosure, the layered nanosheets are of a particle size of 10 to 4000 nm.

In embodiments of the present disclosure, the layered nanosheets are of a particle size of 10 to 3000 nm.

In embodiments of the present disclosure, the oil-soluble alkylamines are primary amines, secondary amines, tertiary amines or cyclic amines.

In embodiments of the present disclosure, the oil-soluble alkylamines are Guerbet primary amines, aliphatic amines or poly-aliphatic amines.

In embodiments of the present disclosure, the Guerbet primary amines have a structure as shown in formula 1:

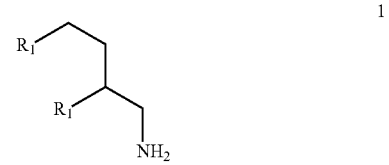

wherein $R_1$ is $C_{1-20}$ linear or branched hydrocarbyl.

In embodiments of the present disclosure, the aliphatic amines have a structure as shown in formula2:

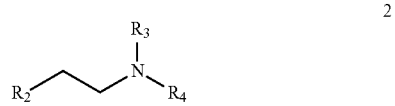

wherein $R_2$ is $C_{4-20}$ linear or branched hydrocarbyl; $R_3$ and $R_4$ each are independently —H, —$CH_3$, or —$CH_2CH_3$, preferably —H or —$CH_3$.

In embodiments of the present disclosure, the aliphatic amines include unsaturated aliphatic primary amines containing C=C.

In embodiments of the present disclosure, the aliphatic amines are at least one selected from a group consisting of the following primary amines: oleic amine, petroselinic amine, erucic amine, linoleic amine, linolenic amine, ricinoleic amine, 10-undecylenic amine, calendic amine, vernolic amine, santalbic amine, 5-eicosenoic amine, α-eleostearic amine, punicic amine, Hoffman degradation amine of oleic acid amide, Hoffman degradation amine of petroselinic acid amide, Hoffman degradation amine of erucic acid amide, Hoffman degradation amine of linoleic amide, Hoffman degradation amine of linolenic acid amide, Hoffman degradation amine of ricinoleic acid amide, Hoffman degradation amine of 10-undecylenic acid amide, Hoffman degradation amine of calendic acid amide, Hoffman degradation amine of vernolic acid amide, Hoffman degradation amine of santalbic acid amine, Hoffman degradation amine of 5-eicosenoic acid amide, Hoffman degradation amine of α-eleostearic acid amide, and Hoffman degradation amine of punicic acid amide. Structures of above primary amines are shown as follows from up to down.

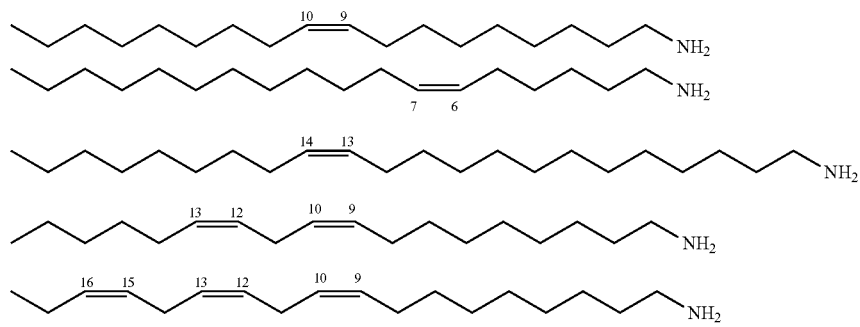

-continued

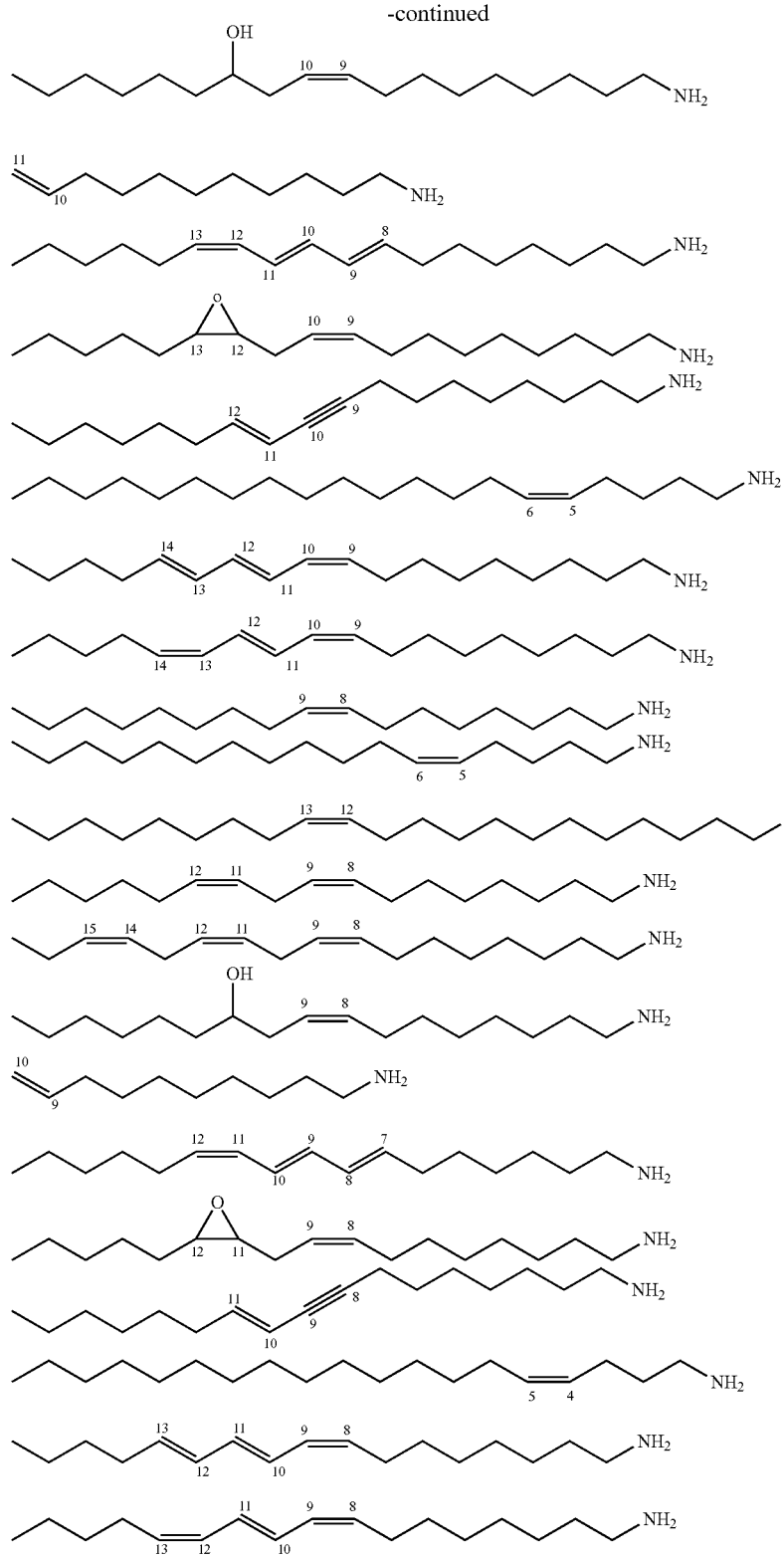

In embodiments of the present disclosure, the poly-aliphatic amines are homopolymers or copolymers of the unsaturated aliphatic primary amines containing C=C.

In embodiments of the present disclosure, the spherical nanoparticles are at least one selected from a group consisting of metal oxide nanoparticles, metal nanoparticles and surface-oxidized metal nanoparticles.

In embodiments of the present disclosure, the oxide nanoparticles are at least one selected from silicon dioxide nanoparticles. In embodiments of the present disclosure, the metal oxide nanoparticles are at least one selected from a group consisting of zinc oxide nanoparticles, aluminum oxide nanoparticles, copper oxide nanoparticles, nickel oxide nanoparticles, cobalt oxide nanoparticles, $Fe_2O_3$ nanoparticles, $Fe_3O_4$ nanoparticles, magnesium oxide nanoparticles, titanium oxide nanoparticles, zirconia nanoparticles, tungsten oxide nanoparticles, molybdenum oxide nanoparticles and tin oxide nanoparticles.

In embodiments of the present disclosure, the metal nanoparticles are at least one selected from a group consisting of copper nanoparticles, iron nanoparticles, magnesium nanoparticles, aluminum nanoparticles, titanium nanoparticles, zirconium nanoparticles and tin nanoparticles.

In embodiments of the present disclosure, the spherical nanoparticles have a particle size of 5 to 1000 nm, preferably 50 to 800 nm.

In embodiments of the present disclosure, in the third mixture, a molar ratio of the layered nanosheets to the oil-soluble alkylamines is 1:1 to 1:40, preferably 1:1 to 1:25; a volume ratio of the layered nanosheets to the spherical nanoparticles is 1:0.001 to 1:10, preferably 1:0.01 to 1:5.

In the present disclosure, the method for simultaneously and stably dispersing spherical nanoparticles in the oil medium by using layered nanosheets may serve as a universally applicable method for dispersing the layered materials and the spherical materials in the oil medium.

In a second aspect of the present disclosure, there is provided an oil blend containing both layered nanosheets and spherical nanoparticles. In embodiments of the present disclosure, the oil blend is prepared by the method described above. The inventors surprisingly find that the oil blend containing the layered nanosheets and the spherical nanoparticles exhibits good stability without sedimentation and phase separation for a long period.

In a third aspect of the present disclosure, the oil blend containing both layered nanosheets and spherical nanoparticles according embodiments of the present disclosure can be effectively used in the preparation of lubricating oils and lubricating greases. Accordingly, the present disclosure provides in embodiments the use of the oil blend containing both layered nanosheets and spherical nanoparticles described above in the preparation of lubricating oils and lubricating greases. In embodiments of the present disclosure, the so-prepared lubricating oil exhibits a good abrasive resistance property.

DETAILED DESCRIPTION

Figure 1:
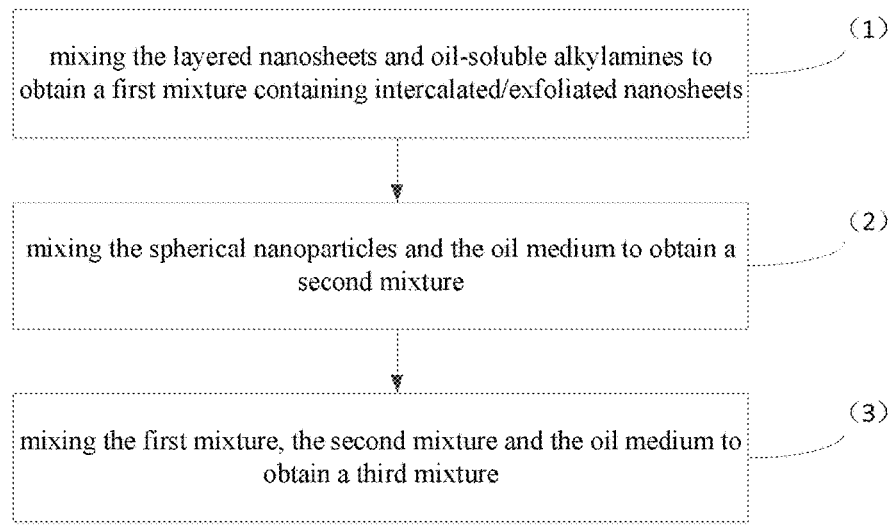
FIG. 1 is a flow chart showing a method for simultaneously and stably dispersing spherical nanoparticles in an oil medium by using layered nanosheets according to an embodiment of the present disclosure.
Figure 2:
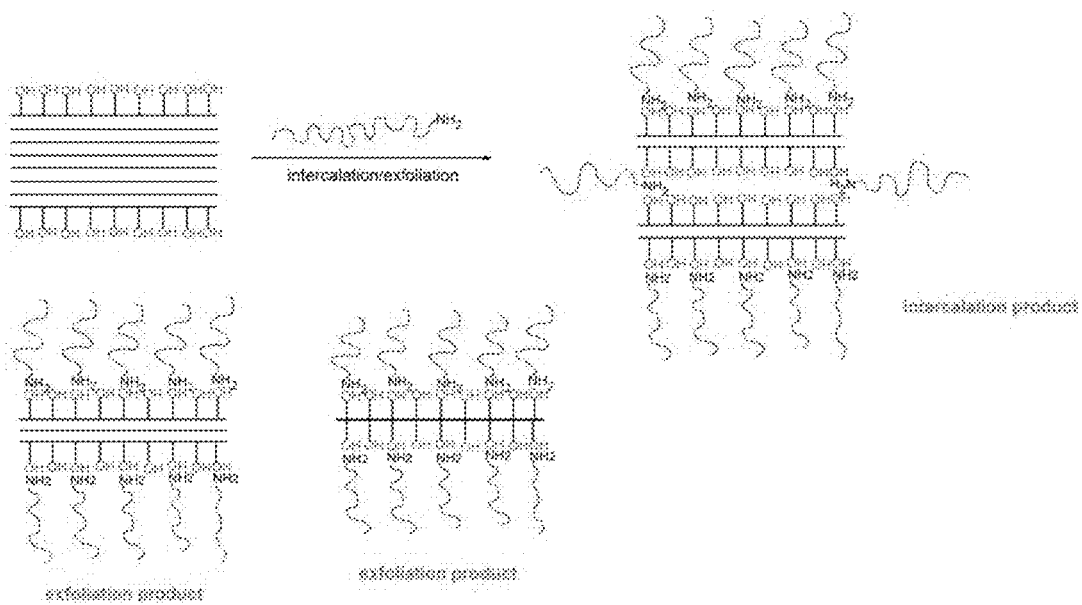
FIG. 2 is a schematic view showing mechanism of mixing layered nanosheets and oil-soluble alkylamines according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. If the specific technology or conditions are not specified in the examples, a step will be performed in accordance with the techniques or conditions described in the literature in the art or the product instructions. If the manufacturers of reagents or instruments are not specified, the reagents or instruments may be commercially available. In a first aspect of the present disclosure, there is provided a method for simultaneously and stably dispersing spherical nanoparticles in an oil medium by using layered nanosheets. According to some embodiments of the present disclosure, with reference to FIG. 1, the method includes a step of (1) mixing the layered nanosheets and oil-soluble alkylamines to obtain a first mixture. The mechanism of mixing layered nanosheets and oil-soluble alkylamines is shown in FIG. 2.

According to an embodiment of the present disclosure, the layered nanosheets and the oil-soluble alkylamines are mixed by means of heat treatment, ultrasonic treatment or mechanical agitation, such that the layered nanosheets and the oil-soluble alkylamines are mixed uniformly in a quick and effective manner.

According to an embodiment of the present disclosure, the layered nanosheets are at least one selected from α-zirconium phosphate, θ-zirconium phosphate, γ-zirconium phosphate, layered metal phosphates, clays, layered double hydroxides (LDHs), layered disulfide metal salts and layered tungsten acid metal salts. As such, the spherical nanoparticles may interact with the layered nanosheets modified by intercalating efficiently in subsequent steps, so that the layered nanosheets and the spherical nanoparticles can be simultaneously and stably dispersed in the oil medium efficiently, thus obtaining an oil blend exhibiting good stability.

Specifically, θ-zirconium phosphate (θ-ZrP, Zr(HPO$_4$)$_2$.6H$_2$O) differs from α-ZrP merely in term of an interval distance between layers in their chemical structures. In specific, as compared with α-ZrP having the interval distance between layers of 7.6 Å, θ-ZrP has a wider interval distance between layers of 10.3 Å to 10.4 Å. Such a subtle difference comes from the different numbers of H$_2$O contained in θ-ZrP (6 H$_2$O) and α-ZrP (1 H$_2$O). Accordingly, it becomes easier for the intercalating reaction with the increasing interval distance between layers as to θ-ZrP. After dehydration, θ-ZrP transforms to α-ZrP. The latter enables the intercalated materials to be kept their original physicochemical properties if used as an original host. As such, θ-ZrP is an ideal host material for the intercalating reaction. Further, comparing with α-ZrP and θ-ZrP, γ-zirconium phosphate (γ-ZrP, ZrPO$_4$(H$_2$PO$_4$).2H$_2$O) has totally different layered crystal structures. γ-ZrP is a more ideal host material for the intercalating reaction due to its interval distance between layers (12.2 Å) wider than either α-ZrP or θ-ZrP. Therefore, θ-ZrP and γ-ZrP can be effectively modified by intercalating/exfoliating with oil-soluble alkylamines, so that the spherical nanoparticles can be effectively stabilized in the oil medium, and thus both layered nanosheets and spherical nanoparticles can be simultaneously and stably dispersed in the oil medium.

According to an embodiment of the present disclosure, the layered nanosheets are of a particle size of 10 to 4000 nm, facilitating simultaneous and stable dispersion of the layered nanosheets and the spherical nanoparticles in the oil medium, thereby obtaining an oil blend exhibiting a good stability, and thus avoiding phase separation and sedimentation for a long period.

According to an embodiment of the present disclosure, the layered nanosheets are of a particle size of 10 to 3000 nm, facilitating simultaneous and stable dispersion of the spherical nanoparticles in the oil medium by such layered nanosheets, thereby obtaining an oil blend exhibiting good stability, and thus avoiding phase separation and sedimentation for a long period.

According to embodiments of the present disclosure, types of the oil-soluble alkylamines are not limited specifically. According to some embodiments of the present disclosure, the oil-soluble alkylamines are primary amines, secondary amines, tertiary amines or cyclic amines, so that efficiency of the intercalating reaction between oil-soluble alkylamines and the layered nanosheets is improved effectively, thereby facilitating the simultaneous and stable dispersion of the spherical nanoparticles in the oil medium by so-prepared layered nanosheets.

According to an embodiment of the present disclosure, the oil-soluble alkylamines are Guerbet primary amines, aliphatic amines or poly-aliphatic amines, so that the layered nanosheets and the spherical nanoparticles are well dispersed in the oil medium, thereby avoiding liquid phase separation and nanoparticle sedimentation.

According to an embodiment of the present disclosure, the Guerbet primary amines have a structure as shown in formula 1:

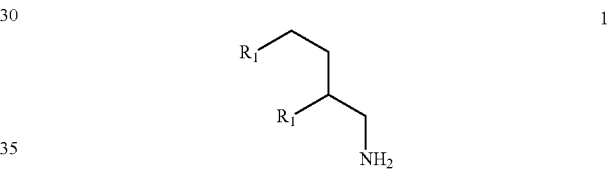

wherein R$_1$ is C$_{1-20}$ linear or branched hydrocarbyl.

According to an embodiment of the present disclosure, the aliphatic amines have a structure as shown in formula 2:

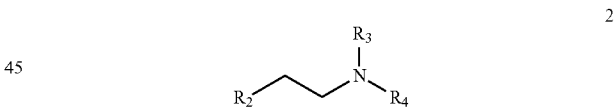

wherein R$_2$ is C$_{4-20}$ linear or branched hydrocarbyl; R$_3$ and R$_4$ each are independently —H, —CH$_3$, or —CH$_2$CH$_3$, preferably —H or —CH$_3$.

According to an embodiment of the present disclosure, the aliphatic amines comprise unsaturated aliphatic primary amines containing C=C.

According to an embodiment of the present disclosure, the aliphatic amines are at least one selected from a group consisting of the following primary amines: oleic amine, petroselinic amine, erucic amine, linoleic amine, linolenic amine, ricinoleic amine, 10-undecylenic amine, calendic amine, vernolic amine, santalbic amine, 5-eicosenoic amine, α-eleostearic amine, punicic amine, Hoffman degradation amine of oleic acid amide, Hoffman degradation amine of petroselinic acid amide, Hoffman degradation amine of erucic acid amide, Hoffman degradation amine of linoleic amide, Hoffman degradation amine of linolenic acid amide, Hoffman degradation amine of ricinoleic acid amide, Hoffman degradation amine of 10-undecylenic acid amide, Hoff man degradation amine of calendic acid amide, Hoffman degradation amine of vernolic acid amide, Hoffman degradation amine of santalbic acid amine, Hoffman degradation amine of 5-eicosenoic acid amide, Hoffman degradation amine of α-eleostearic acid amide, and Hoffman degradation amine of punicic acid amide. Structures of above primary amines are shown as follows from up to down. As such, the nanoparticles stabilized by the layered nanosheets are well dispersed in the oil medium, resulting in an oil blend exhibiting good stability.

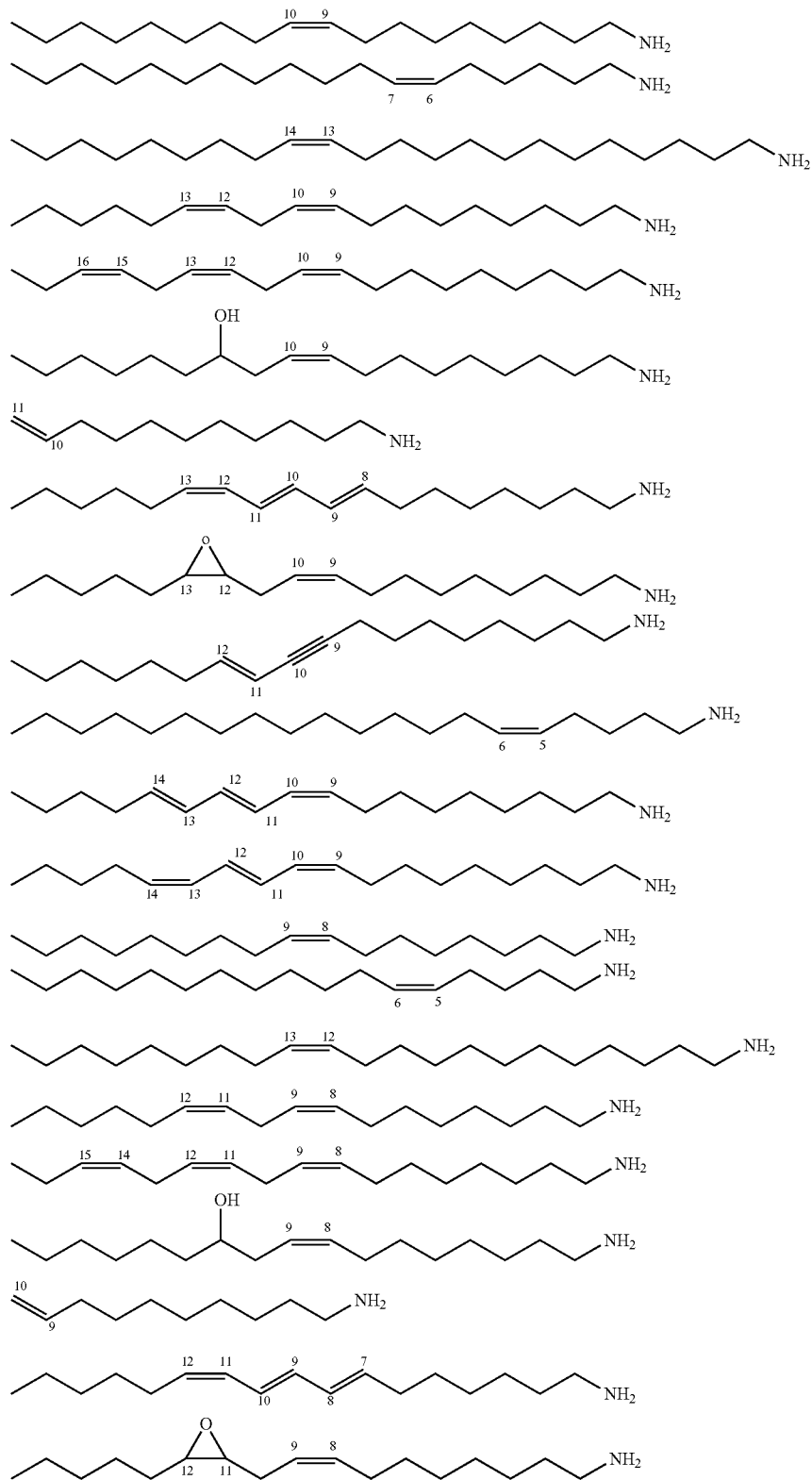

-continued

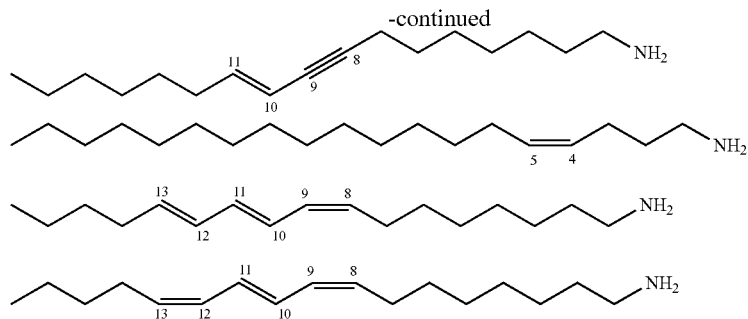

According to an embodiment of the present disclosure, the poly-aliphatic amines are homopolymers or copolymers of the unsaturated aliphatic primary amines described above, so as to improve the nanoparticles stabilized by the layered nanosheets to be well dispersed in the oil medium, resulting in an oil blend exhibiting good stability.

According to embodiments of the present disclosure, the method includes a step of (2) mixing the spherical nanoparticles and the oil medium to obtain a second mixture.

According to an embodiment of the present disclosure, the spherical nanoparticles and the oil medium are mixed by means of heat treatment, ultrasonic treatment or mechanical agitation, such that the spherical nanoparticles and the oil medium are mixed uniformly in an effective manner.

According to an embodiment of the present disclosure, the spherical nanoparticles are at least one selected from a group consisting of metal oxide nanoparticles, metal nanoparticles and surface-oxidized metal nanoparticles, such that the spherical nanoparticles interact with the layered nanosheets modified by intercalating effectively, thereby avoiding sedimentation when dispersing the nanoparticles in the oil medium.

According to an embodiment of the present disclosure, the oxide nanoparticles are at least one selected from silicon dioxide nanoparticles.

According to an embodiment of the present disclosure, the metal oxide nanoparticles are at least one selected from a group consisting of zinc oxide nanoparticles, aluminum oxide nanoparticles, copper oxide nanoparticles, nickel oxide nanoparticles, cobalt oxide nanoparticles, $Fe_2O_3$ nanoparticles, $Fe_3O_4$ nanoparticles, magnesium oxide nanoparticles, titanium oxide nanoparticles, zirconia nanoparticles, tungsten oxide nanoparticles, molybdenum oxide nanoparticles and tin oxide nanoparticles, such that the spherical nanoparticles interact with the layered nanosheets modified by intercalating efficiently, thereby avoiding sedimentation when dispersing the nanoparticles in the oil medium.

According to an embodiment of the present disclosure, the metal nanoparticles are at least one selected from a group consisting of copper nanoparticles, iron nanoparticles, magnesium nanoparticles, aluminum nanoparticles, titanium nanoparticles, zirconium nanoparticles and tin nanoparticles, such that the spherical nanoparticles interact with the layered nanosheets modified by intercalating efficiently, thereby avoiding sedimentation when dispersing the nanoparticles in the oil medium, and thus improving stability of the resulting oil blend.

According to an embodiment of the present disclosure, the spherical nanoparticles have a particle size of 5 to 1000 nm, for example 50 to 800 nm. The spherical nanoparticles having such a particle size may interact with the layered nanosheets modified by intercalating efficiently, thereby avoiding sedimentation when dispersing the nanoparticles in the oil medium, and thus improving the dispersion of both layered nanosheets and spherical nanoparticles in the oil medium. In addition, an oil blend obtained therefrom exhibits good stability, avoiding phase separation and sedimentation for a long period of time.

Figure 3:
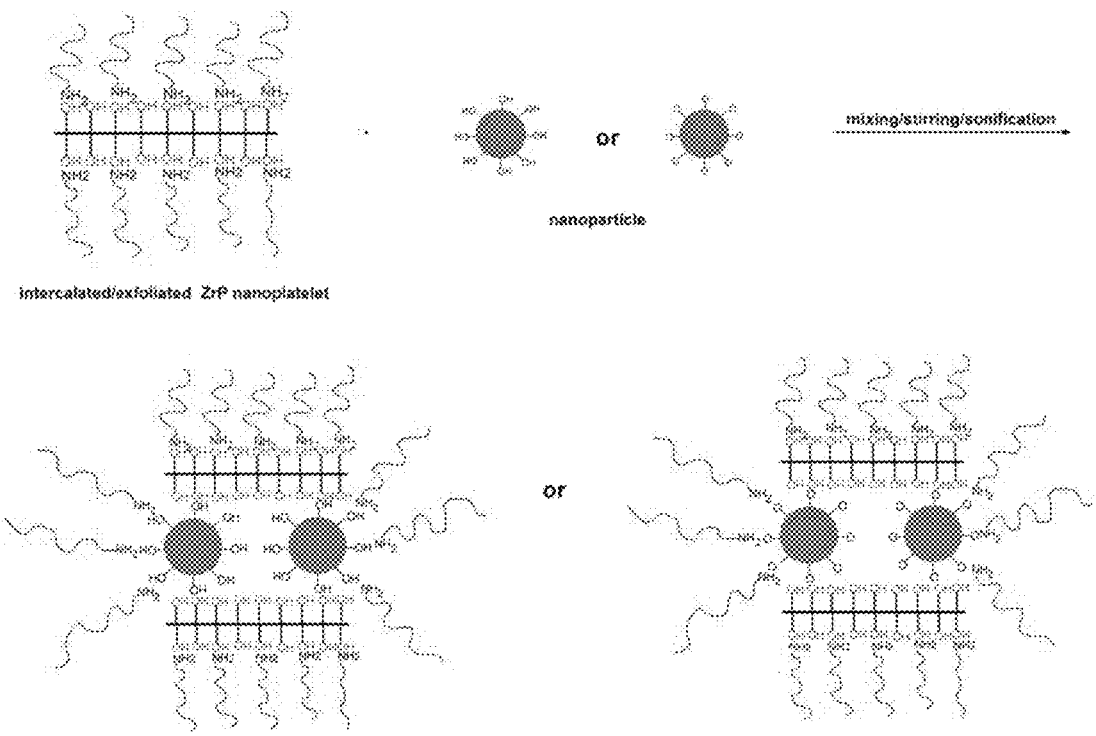
FIG. 3 is a schematic view showing mechanism of mixing layered nanosheets, spherical nanoparticles and oil-soluble alkylamines according to an embodiment of the present disclosure.

According to embodiments of the present disclosure, the method includes a step of (3) mixing the first mixture, the second mixture and the oil medium to obtain a third mixture, i.e., the oil blend. In the third mixture, a schematic view showing mechanism of stabilizing the spherical nanoparticles with the nanosheets modified by intercalating/exfoliating with oil-soluble alkylamines is shown in FIG. 3.

According to an embodiment of the present disclosure, the first mixture, the second mixture and the oil medium are mixed by means of heat treatment, ultrasonic treatment or mechanical agitation, such that the first mixture, the second mixture and the oil medium are mixed uniformly in an effective manner, resulting in an oil blend exhibiting good dispersion and therein good stability.

According to embodiments of the present disclosure, the oil medium is not limited specifically, and may be any known oil medium. According to a specific embodiment of the present disclosure, the oil medium is base oil of the lubricating oil, such that the third mixture obtained may be used as lubricating oil exhibiting good friction property, appropriate viscosity and high abrasive resistance due to the layered nanosheets and the spherical nanoparticles contained therein.

According to an embodiment of the present disclosure, in the third mixture, a molar ratio of the layered nanosheets to the oil-soluble alkylamines is 1:1 to 1:40, for example 1:1 to 1:25; a volume ratio of the layered nanosheets to the spherical nanoparticles is 1:0.001 to 1:10, for example 1:0.01 to 1:5, such that the spherical nanoparticles interact with the layered nanosheets modified by intercalating effectively, thereby avoiding sedimentation when dispersing the nanoparticles in the oil medium, and thus improving the stability of the oil blend.

The inventors have found that the method according to embodiments of the present disclosure stabilizes spherical nanoparticles with layered nanosheets, such that both the layered nanosheets and the spherical nanoparticles can be simultaneously and stably dispersed in the oil medium, resulting in a solution or microemulsion exhibiting good stability without sedimentation or phase separation. Such a method is easy and convenient to be operated.

Further, the inventors have found that the method according to embodiments of the present disclosure can effectively disperse both layered nanosheets and spherical nanoparticles in the base oil of the lubricating oil uniformly in an effective manner, so that both the layered nanosheets and the spherical nanoparticles may be used as additives together to improve the anti-friction and the abrasive resistance properties effectively.

In a second aspect of the present disclosure, there is provided an oil blend containing both layered nanosheets and spherical nanoparticles. According to embodiments of the present disclosure, the oil blend is prepared by the method described above. The inventors have surprisingly found that the oil blend containing both the layered nanosheets and the spherical nanoparticles exhibits good stability, avoiding sedimentation or phase separation for a long period of time. In addition, the oil blend containing both the layered nanosheets and the spherical nanoparticles can be effectively used in preparation of lubricating oils and lubricating greases with good anti-friction property and high abrasive resistance.

In a third aspect of the present disclosure, there is provided use of the oil blend containing both the layered nanosheets and the spherical nanoparticles described above in the preparation of lubricating oils and lubricating greases. According to embodiments of the present disclosure, the lubricating oils and the lubricating greases exhibit good anti-friction property and abrasive resistance.

Figure 5:
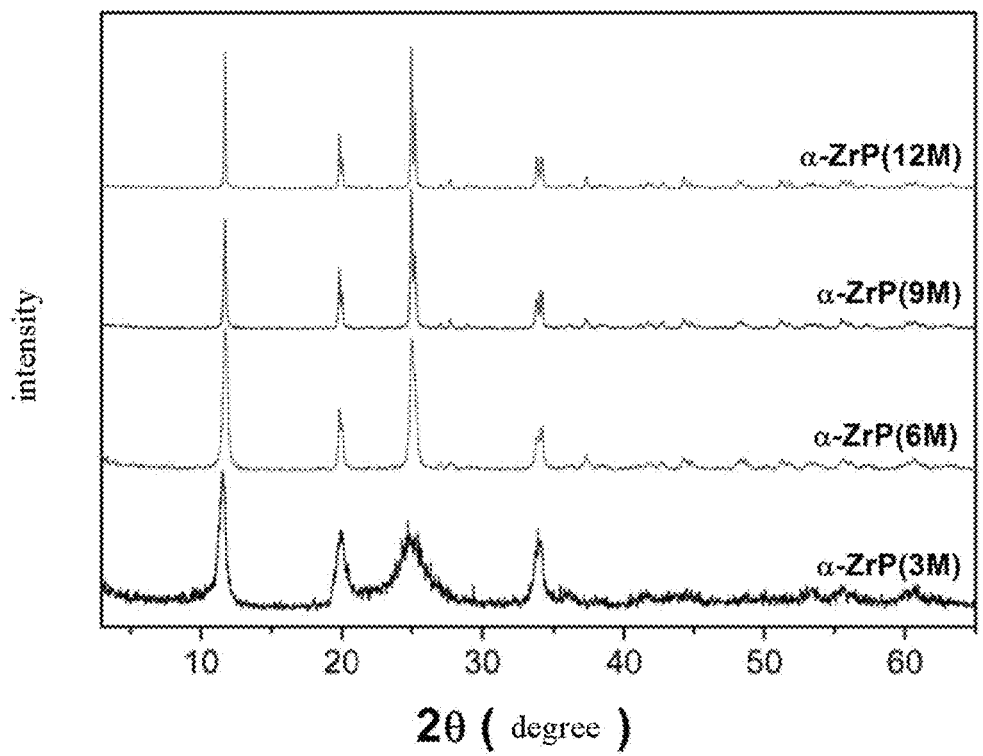
FIG. 5 is XRD patterns of α-ZrP fine powders synthesized by a reflux method at different phosphoric acid concentrations according to an embodiment of the present disclosure.
Figure 6:
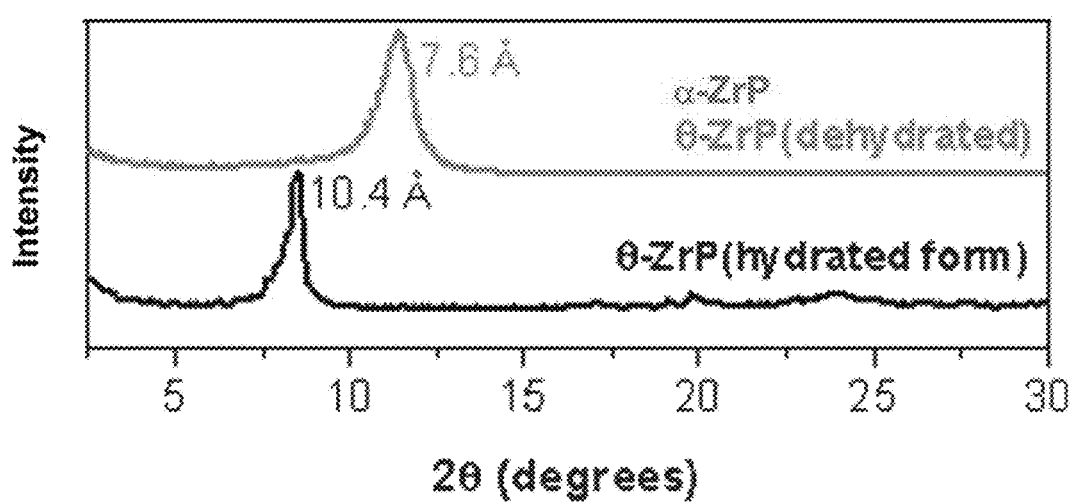
FIG. 6 is a comparison of XRD patterns between α-ZrP fine powders and θ-ZrP fine powders according to an embodiment of the present disclosure.
Figure 7:
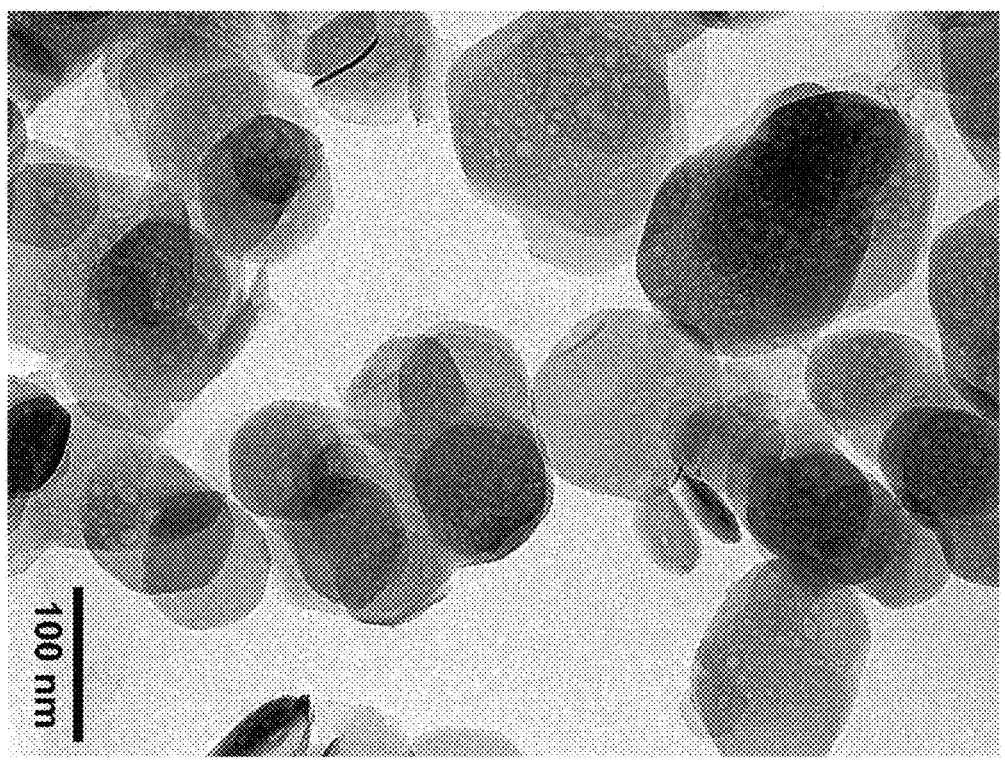
FIG. 7 is an electron microscopy image showing α-ZrP fine powders synthesized by a reflux method at a phosphoric acid concentration of 3 mol/L according to an embodiment of the present disclosure.

Example 1: Synthesis of α-Zirconium Phosphate 8.0 g $ZrOCl_2·8H_2O$ and 80 ml $H_3PO_4$ (a mass fraction is 85%) with concentrations of 3.0 mol/L, 6.0 mol/L, 9.0 mol/L and 12.0 mol/L were added into a three-necked flask respectively, and refluxed for 24 h at 100° C. After reaction, primary reaction products were washed three times and collected by centrifugation, thus obtaining products α-ZrP (3M), α-ZrP (6M), α-ZrP (9M) and α-ZrP (12M), respectively. Specifically, the products α-ZrP (3M), α-ZrP (6M), α-ZrP (9M) and α-ZrP (12M) are products when the concentration is 3.0 mol/L, 6.0 mol/L, 9.0 mol/L and 12 mol/L, respectively. Then, the products were dried for 24 h at 65° C. followed by grinded into α-ZrP fine powders. At 25° C., the α-ZrP fine powders are of a density of about 2.72 g·cm$^{-3}$. The α-ZrP fine powders were then tested by XRD and the XRD patterns of α-ZrP (dehydrated α-ZrP) are shown in FIGS. 5 and 6. An electron microscopy image of the α-ZrP (3M) fine powders is shown in FIG. 7. It can be seen from FIG. 7, the α-ZrP (3M) fine powders are of a particle size of about 100 nm.

Example 2: Synthesis of θ-Zirconium Phosphate 3.116 g $ZrOCl_2·8H_2O$ was dissolved in 200 mL deionized water in a beaker, and then mixed with 82.19 ml $H_3PO_4$ (a mass fraction is 85%) and 117.81 ml deionized water in a round-bottom flask. Subsequently, the round-bottom flask containing $H_3PO_4$ solution was disposed in a oil bath with a constant temperature of 94° C. under agitation. After the $H_3PO_4$ solution was stabilized at the temperature of 94° C., a solution of $ZrOCl_2·8H_2O$ was added into the $H_3PO_4$ solution in a dropwise manner, thus obtaining a resulting solution. The resulting solution was kept for reacting at the constant temperature of 94° C. for 48 h under agitation, followed by filtrated, thus obtaining a solid product washed by a large amount of deionized water, i.e., θ-ZrP. Subsequently, θ-ZrP was dried in a drying apparatus for 72 h at a room temperature, and dried θ-ZrP was grinded into fine powders. θ-ZrP nanosheets are of a particle size of about 400 nm. At 25° C., θ-ZrP fine powders are of a density of about 2.44 g·cm$^{-3}$. The θ-ZrP fine powders were tested by XRD and the XRD pattern of θ-ZrP is shown in FIG. 6.

Example 3: Synthesis of γ-Zirconium Phosphate $NaH_2PO_4·H_2O$ (677 g, 4.91 mol) was dissolved in a mix solution containing deionized water (376 ml) and $H_3PO_4$ (182.6 g, 1.58 mol) with a mass fraction of 85%, followed by refluxing for 30 min and then adding 238 ml $ZrOCl_2·8H_2O$ solution (76 g, 1 mol/L), thus obtaining colloids. The colloids were then refluxed for 72 h. Subsequently, colloids after refluxed were transferred into a hydrothermal reactor and heated to 190° C. for 120 h. After reactions, white precipitates were obtained by filtration, and washed with 4 mol/L HCl to remove sodium ions and then with 0.2 mol/L $H_3PO_4$ to remove chloride ions, thus obtaining γ-ZrP after washing with deionized water. Subsequently, γ-ZrP was dried in the drying apparatus for 72 h at a room temperature, and dried γ-ZrP was grinded into fine powders. of θ-ZrP nanosheets are of a particle size of about 150 nm. At 25° C., γ-ZrP fine powders are of a density of about 1.78 g·cm$^{-3}$.

Example 4: Synthesis of 2-n-hexyl-1-n-decyl Guerbet Amine 12.122 g 2-n-hexyl-1-n-decyl Guerbet alcohol (0.05 mol) was added into a 100 ml hydrothermal reactor. Concentrated ammonia water was added into the hydrothermal reactor to satisfy a molar ratio of the Guerbet primary amine to ammonium hydroxide in the concentrated ammonia water to be 1:1.2 to 1:1.6. 10 g powders of aluminium oxide catalysts (a particle diameter is about 10 μm) was added into the hydrothermal reactor. Subsequently, a hydrothermal reaction was kept for 5 h at 120-150° C. After the hydrothermal reaction and cooling, the solution inside the reactor was transferred into a 3-neck flask and refluxed for 3 h at 100° C. in oil bath, so as to remove unreacted ammonia after the hydrothermal reaction, followed by filtration with a Buchner funnel slowly to remove the catalysts, thus obtaining a liquid product. The liquid product was subsequently distilled under reduced pressure to remove moisture, thus obtaining a yellow liquid crude product. The yellow liquid crude product was kept in a refrigerator for 12 h at 0° C., followed by filtration with a Buchner funnel quickly, thus obtaining a final liquid product, i.e., 2-n-hexyl-1-n-decyl Guerbet amine At 25° C., its density is 0.84 g/ml.

Example 5: Synthesis of Hoffman Degradation Amine of Oleic Acid Amide 120 ml ethanol was added into a 500 ml 3-neck flask and then 40.20 g oleic acid amide with a mass friction of 70% was also added therein. Subsequently, in a nitrogen atmosphere, the 3-neck flask was heated in water bath under quick agitation. Subsequently, 8 g sodium hydroxide was dissolved in 80 ml sodium hypochlorite solution (a content of active chlorine is 100-140 g/L) in a 150 ml constant pressure funnel, thus obtaining a mix solution. The mixed solution was added into a 3-neck flask kept at a temperature between 30° C. and 40° C. for 6 h under agitation. After reactions, a resulting solution was distilled under reduced pressure to remove ethanol, thus obtaining an oil phase primary product after liquid-separation. The oil phase primary product was further mixed with a large amount of saturated NaCl solution, so that a final product was obtained after another liquid-separation. At 25° C., its density is 0.83 g/ml.

Example 6: Mixing α-ZrP and Zinc Oxide Nanoparticles

Firstly, 0.2 g α-ZrP (3M) obtained in Example 1 (a particle size is about 100 nm as shown in FIG. 7, a density of the fine powders is about 2.72 g·cm$^{-3}$, and its molecular weight is 301.19 g·mol$^{-1}$) and 4.0 g Hoffman degradation amine of oleic acid amide obtained in Example 5 (the density is 0.83 g/ml and a molecular weight is 253.46 g·mol$^{-1}$) were mixed in a 10 ml glass vial with a molar ratio of the α-ZrP nanosheets to Hoffman degradation amine of oleic acid amide of 1:23.75, followed by subjected to ultrasonic treatment, thus being dispersed uniformly. Secondly, 0.2 g zinc oxide nanoparticles (a particle size is 40-60 nm and a density of fine powders is about 5.61 g·cm$^{-3}$) and 10 g base oil of the lubricating oil (a density is about 0.87 g/ml) were mixed and subjected to the ultrasonic treatment, thus being dispersed uniformly.

Thirdly, after the ultrasonic treatment, α-ZrP-amine mixture and ZnO-oil mixture were dispersed in the lubricating oil at a volume ratio of the α-ZrP-amine mixture to the ZnO-oil mixture of 1:3, in which a volume ratio of the α-ZrP nanosheets to the ZnO spherical nanoparticles is about 1:0.62, thus obtaining lubricating oil dispersed with α-ZrP—ZnO-amine mixture, which is stable transparent solution or microemulsion in light blue color, keeping in static state at room temperature for at least one month.

According to parameters provided by embodiments of the present disclosure, a principle of calculating the volume ratio of the layered nanosheets to the spherical nanoparticles is as follows:

It is assumed that (1) the total volume of the mixture is a sum of every component when adding inorganic nanoparticles into the oil medium due to poor lipophilicity of the inorganic nanoparticles; (2) densities of the nanosheets-oil-soluble amine mixture and spherical nanoparticle-oil mixture after the ultrasonic treatment are uniform during operation.

As such, a volume fraction of α-ZrP in the α-ZrP-amine mixture is:

$$\frac{\frac{0.2}{2.72}}{\frac{4.0}{0.83} + \frac{0.2}{2.72}}$$

and a volume fraction of ZnO in the ZnO-oil mixture is:

$$\frac{\frac{0.2}{5.61}}{\frac{10}{0.87} + \frac{0.2}{5.62}}$$

Then, in this embodiment, the volume ratio of α-ZrP nanosheets to ZnO nanoparticles in the α-ZrP-amine-ZnO-oil mixture is about:

$$\frac{\frac{0.2}{2.72}}{\frac{4.0}{0.83} + \frac{0.2}{2.72}} : 3 \times \frac{\frac{0.2}{5.61}}{\frac{10}{0.87} + \frac{0.2}{5.62}} \approx 1:0.62$$

Example 7: Mixing θ-ZrP and Zirconium Oxide Nanoparticles

Firstly, 0.2 g θ-ZrP obtained in Example 2 (a particle size is about 400 nm, the density of the fine powders is about 2.44 g·cm$^{-3}$, and its molecular weight is 391.27 g·mol$^{-1}$) and 3.0 g 2-n-hexyl-1-n-decyl Guerbet amine obtained in Example 4 (the density is 0.84 g/ml and a molecular weight is 241.46 g·mol$^{-1}$) were mixed in a 10 ml glass vial with a molar ratio of the θ-ZrP nanosheets to 2-n-hexyl-1-n-decyl Guerbet amine of 1:24.33, followed by subjected to ultrasonic treatment, thus being dispersed uniformly.

Secondly, 0.3 g zirconium oxide nanoparticles (a particle size is 200-400 nm and a density of fine powders is about 5.89 g·cm$^{-3}$) and 10 g base oil of the lubricating oil (the density is about 0.87 g/ml) were mixed in a 20 ml glass vial and subjected to the ultrasonic treatment, thus being dispersed uniformly.

Thirdly, after the ultrasonic treatment, θ-ZrP-amine mixture and ZrO$_2$-oil mixture were dispersed in the lubricating oil at a volume ratio of the θ-ZrP-amine mixture to the ZrO$_2$-oil mixture of 1:2, in which a volume ratio of the θ-ZrP nanosheets to the ZrO$_2$ spherical nanoparticles is about 1:0.39 (the calculation is the same as in Example 6), thus obtaining lubricating oil dispersed with θ-ZrP—ZrO$_2$-amine mixture, which is stable transparent solution or microemulsion in light blue color, keeping in static state at a room temperature for at least one month.

Example 8: Mixing γ-ZrP, Zirconium Oxide Nanoparticles and Silicon Oxide Nnanoparticles Firstly, 0.2 g γ-ZrP obtained in Example 3 (a particle size is about 150 nm, the density of the fine powders is about 1.78 g·cm$^{-3}$, and its molecular weight is 319.21 g·mol$^{-3}$) and 3.0 g 2-n-hexyl-1-n-decyl Guerbet amine obtained in Example 4 (the density is 0.84 g/ml and the molecular weight is 241.46 g·mol$^{-3}$) were mixed in a 10 ml glass vial with a molar ratio of the γ-ZrP nanosheets to 2-n-hexyl-1-n-decyl Guerbet amine of 1:19.84, followed by subjected to ultrasonic treatment, thus being dispersed uniformly.

Secondly, 0.4 g zirconium oxide nanoparticles (the particle size is 200-400 nm and the density of fine powders is about 5.89 g·cm$^{-3}$) and 10 g base oil of the lubricating oil (the density is about 0.87 g/ml) were mixed in a 20 ml glass vial and subjected to the ultrasonic treatment, thus being dispersed uniformly. 0.3 g silicon oxide nanoparticles (the particle size is about 50 nm and a density of fine powders is about 2.60 g·cm$^{-3}$) and 10 g base oil of the lubricating oil (the density is about 0.87 g/ml) were mixed in another 20 ml glass vial and subjected to the ultrasonic treatment, thus being dispersed uniformly.

Thirdly, after the ultrasonic treatment, γ-ZrP-amine mixture, ZrO$_2$-oil mixture and SiO$_2$-oil mixture were dispersed in the lubricating oil at a volume ratio of the γ-ZrP-amine mixture to the ZrO$_2$-oil mixture to the SiO$_2$-oil mixture of 1:2:2, in which a volume ratio of the γ-ZrP nanosheets to the ZrO$_2$ spherical nanoparticles to the SiO$_2$ spherical nanoparticles is about 1:0.39:0.65 (the calculation is the same as in Example 6), thus obtaining lubricating oil dispersed with γ-ZrP—ZrO$_2$—SiO$_2$-amine mixture, which is stable transparent solution or microemulsion in light blue color, keeping in static state at a room temperature for at least one month.

Example 9: Mixing α-ZrP and Copper Nanoparticles

Firstly, 0.4 g α-ZrP (3M) obtained in Example 1 (the particle size is about 100 nm as shown in FIG. 7, the density of the fine powders is about 2.72 g·cm$^{-3}$, and the molecular weight is 301.19 g·mol$^{-1}$) and 8.0 g oleic acid amine (a density is 0.81 g/ml and its molecular weight is 267.49 g·mol$^{-1}$) were mixed in a 10 ml glass vial with a molar ratio of the α-ZrP nanosheets to oleic acid amine of 1:22.52, followed by subjected to ultrasonic treatment, thus being dispersed uniformly.

Secondly, 0.06 g copper nanoparticles (a particle size is 80-100 nm and a density of fine powders is about 8.94 g·cm$^{-3}$) and 16 g base oil of the lubricating oil (a density is about 0.87 g/ml) were mixed and subjected to the ultrasonic treatment, thus being dispersed uniformly.

Thirdly, α-ZrP-amine mixture and Cu-oil mixture were dispersed in the lubricating oil at a volume ratio of 1:1, so that six groups of mixtures with different α-ZrP mass fractions of 4.2×10$^{-4}$, 8.4×10$^{-4}$, 12.6×10$^{-4}$, 16.8×10$^{-4}$, 21×10$^{-4}$ and 25.2×10$^{-4}$, respectively, were prepared, in which a volume ratio of the α-ZrP nanosheets to the Cu spherical nanoparticles is about 1:0.025 (the calculation is the same as in Example 6). The preparation method was as follows: (1) 10 drops of well-dispersed α-ZrP-amine mixture pipetted by a plastic-head pipette were weighted to be 0.30 g, so that mass of α-ZrP in each drop was about 0.30/(21×10)=1/700≈0.0014 g; (2) 3, 6, 9, 12, 15 and 18 drops of α-ZrP-amine mixture were added into six 10 ml glass vials by the plastic-head pipette, respectively, and then 3, 6, 9, 12, 15 and 18 drops of Cu-oil mixture were added correspondingly in this six 10 ml glass vials by the plastic-head pipette, respectively; (3) base oil of lubricating oil was added in each vial until the mass of each mixture in the vial was up to 10 g; (4) after the ultrasonic treatment, α-ZrP—Cu-amine-oil mixture dispersed uniformly was obtained.

Figure 4:
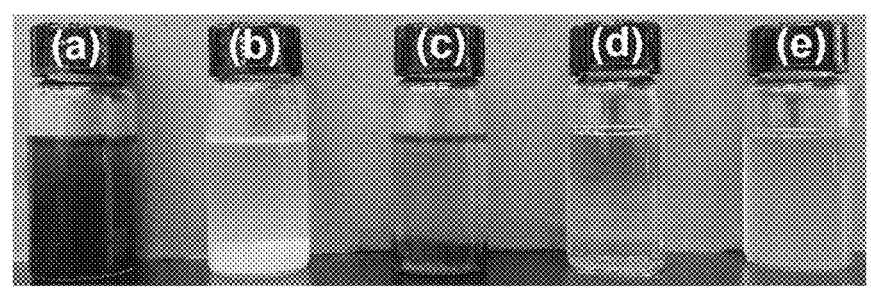
FIG. 4 is a picture showing different samples of lubricating oil containing base oil added with different additives after 24 hours according to an embodiment of the present disclosure. The samples are respectively shown from left to right: (a) spherical Cu nanoparticles without ligands had been dispersed in the base oil of the lubricating oil; (b) layered α-ZrP unmodified by intercalating/exfoliating with oil-soluble alkylamines had been dispersed in the base oil of the lubricating oil; (c) the spherical Cu nanoparticles without ligands and the layered α-ZrP unmodified by intercalating/exfoliating with oil-soluble alkylamines had been simultaneously dispersed in the base oil of the lubricating oil; (d) the base oil of the lubricating oil as a blank control group; (e) layered α-ZrP modified by intercalating/exfoliating with oleic acid amines and the spherical Cu nanoparticles without ligands had been simultaneously dispersed in the base oil of the lubricating oil.

The lubricating oil with different solid concentrations from low to high, which contains α-ZrP—Cu-amine mixture dispersed therein, is stable transparent solution or microemulsion in light blue color, keeping in static state at a room temperature for at least one month. FIG. 4 is a comparison picture showing different samples of lubricating oil containing base oil well dispersed with α-ZrP—Cu-amine mixture and other additives, for observing stabilities. The samples are as follows from left to right: (a) spherical Cu nanoparticles without ligands had been dispersed in the base oil of the lubricating oil; (b) layered α-ZrP unmodified by intercalating/exfoliating with oil-soluble alkylamines had been dispersed in the base oil of the lubricating oil; (c) the spherical Cu nanoparticles without ligands and the layered α-ZrP unmodified by intercalating/exfoliating with oil-soluble alkylamines had been simultaneously dispersed in the base oil of the lubricating oil; (d) the base oil of the lubricating oil as a blank control group; (e) layered α-ZrP modified by intercalating/exfoliating with oleic acid amines and the spherical Cu nanoparticles without ligands had been simultaneously dispersed in the base oil of the lubricating oil. It can be seen from FIG. 4 that α-ZrP—Cu-amine mixture is stably dispersed in the base oil of the lubricating oil.

Example 10: Reciprocating Friction Test

Figure 8:
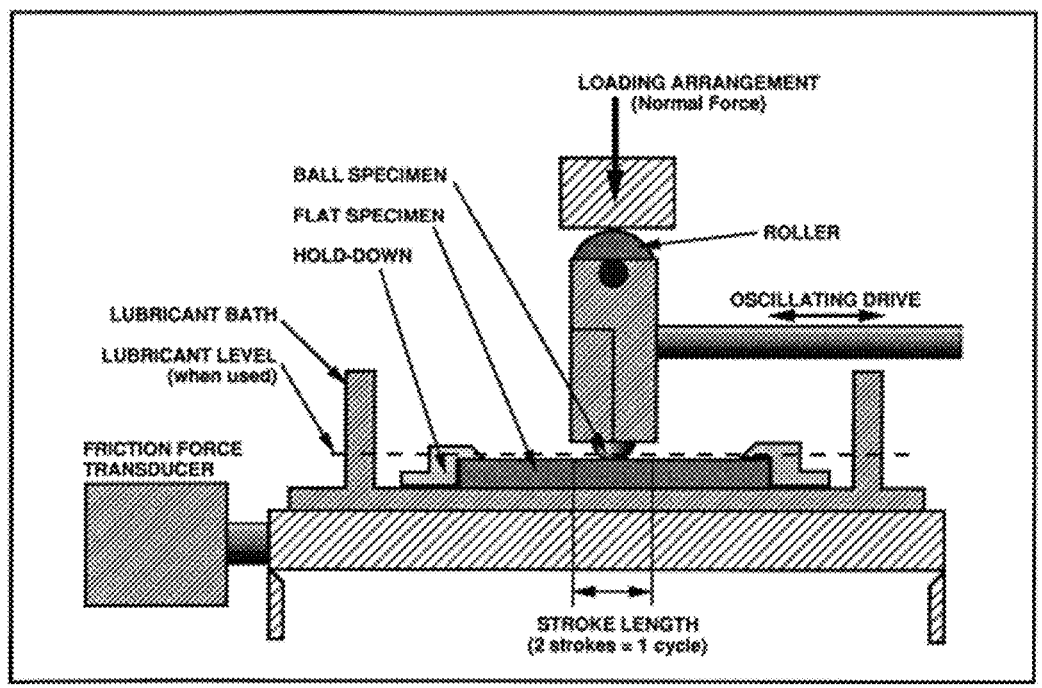
FIG. 8 is a schematic diagram showing mechanism of reciprocating friction test according to an embodiment of the present disclosure.

In this example, the lubricating oil containing α-ZrP—Cu-amine mixture dispersed therein in Example 9 was subjected to the reciprocating friction test. Specifically, the standard of the reciprocating friction test is G133 standard of American Society for Testing Materials (ASTM G133) and a schematic diagram showing mechanism of the reciprocating friction test is shown in FIG. 8. In the test, all test balls (HRc is 30, surface accuracy is G100) were made of 304 stainless steel, and were immersed in the lubricating oil, and test parameters are shown in the following table:

| Parameters | model/value |
|---|---|
| sampling | linear model |
| full amplitude | 6.00 mm |
| maximum line velocity | 0.25 cm/s |
| frequency | 0.00 Hz |
| standard load | 7.00 N |
| terminal condition | 1.60 m |
| effective termination | Meters |
| sampling velocity | 5.0 Hz |
| sampling period | once per period |
| test temperature | 24° C. |
| relative air humidity | 60.00% |

Figure 9:
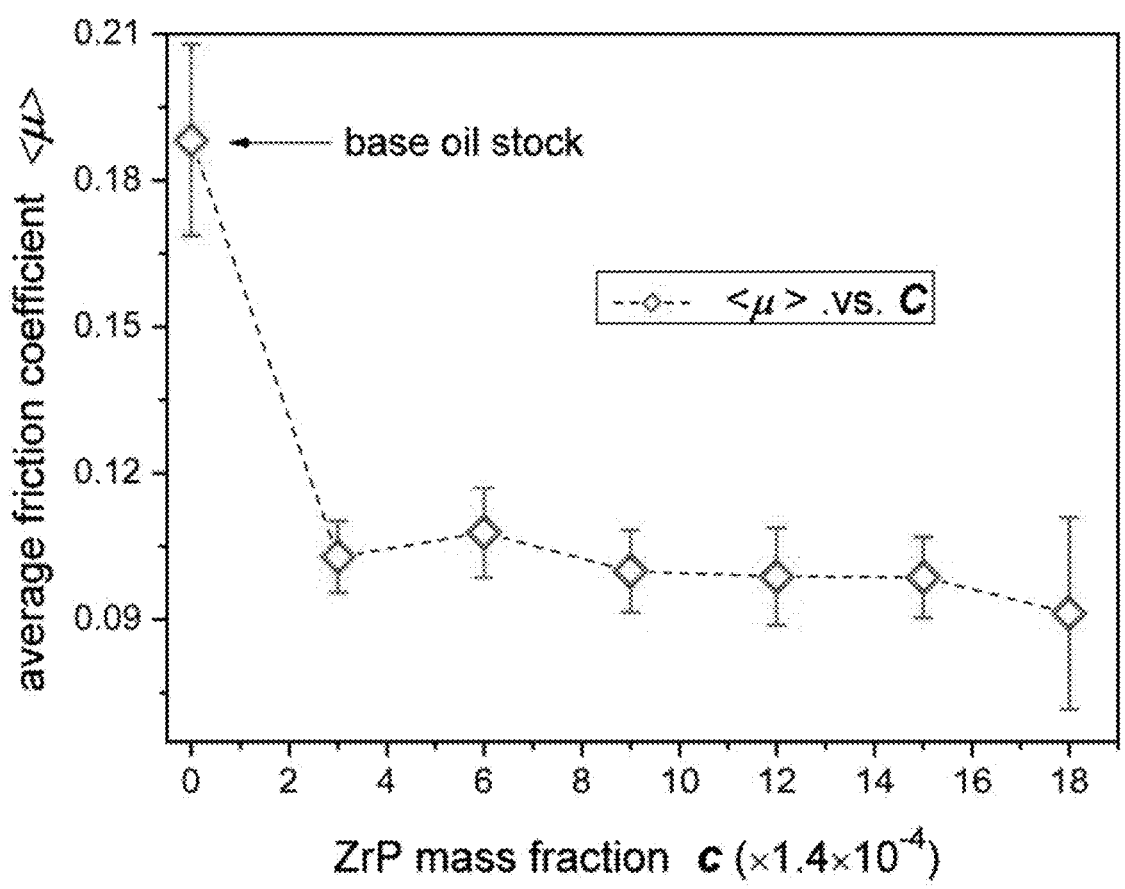
FIG. 9 is a diagram showing a test result of average friction coefficient $<\mu>$ of the lubricating oil containing different mass fractions of ZrP according to an embodiment of the present disclosure.
Figure 10:
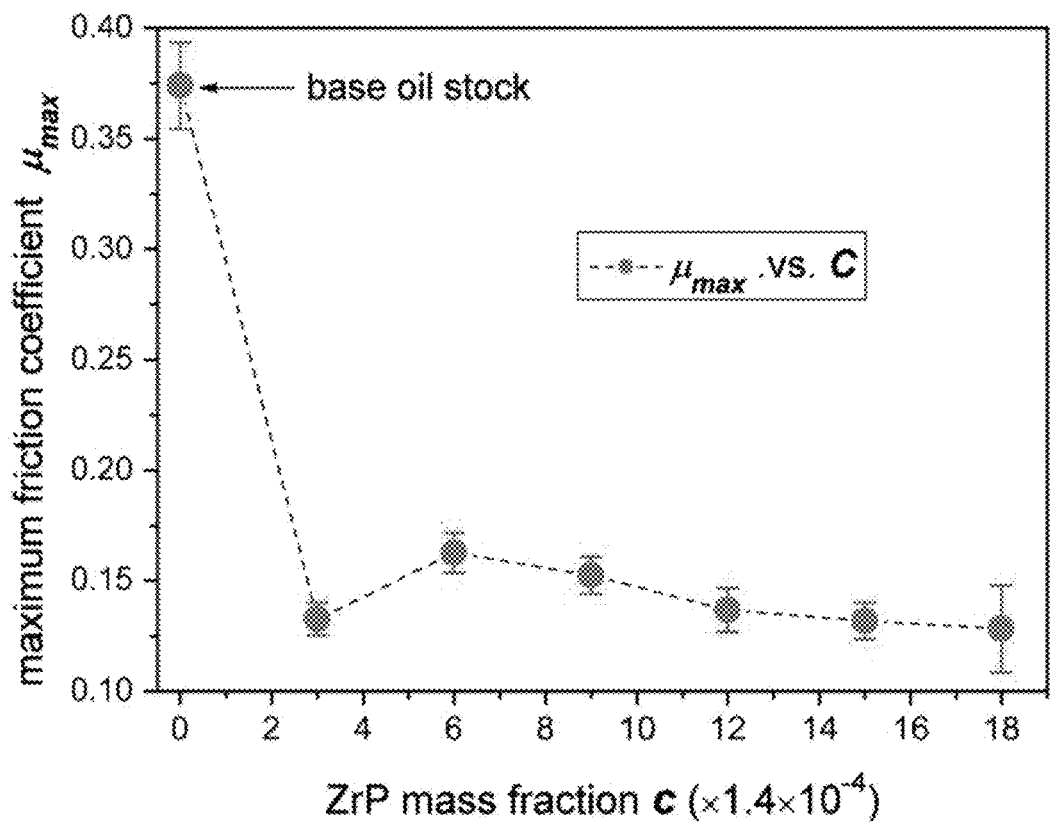
FIG. 10 is a diagram showing a test result of maximum friction coefficient ($\mu_{max}$) of the lubricating oil containing different mass fractions of ZrP according to an embodiment of the present disclosure.

FIG. 9 is a diagram showing a test result of average friction coefficient <μ> of the lubricating oil containing different mass fractions of ZrP and it can be seen from that, <μ> is gradually decreased with the mass friction of α-ZrP being increased. FIG. 10 is a diagram showing a test result of maximum friction coefficient ($\mu_{max}$) of the lubricating oil containing different mass fractions of ZrP and it can be seen from that, $\mu_{max}$ is decreased with the mass friction of α-ZrP being increased. It can be seen from FIGS. 9 and 10, a threshold of the mass fraction of α-ZrP is about 4.2×10$^{-4}$.

Specifically, <μ> is a time average value of an instantaneous friction coefficient μ, and the calculation formula is as follow:

$$\langle \mu \rangle = \frac{\int \mu dt}{\int dt}$$

A error bar Δμ of the friction coefficient μ is calculated by absolute minimum variance method, and the calculation formula is as follow:

$$\Delta \mu = \pm \frac{\int |\mu - \langle \mu \rangle| dt}{\int dt}$$

Figure 11:
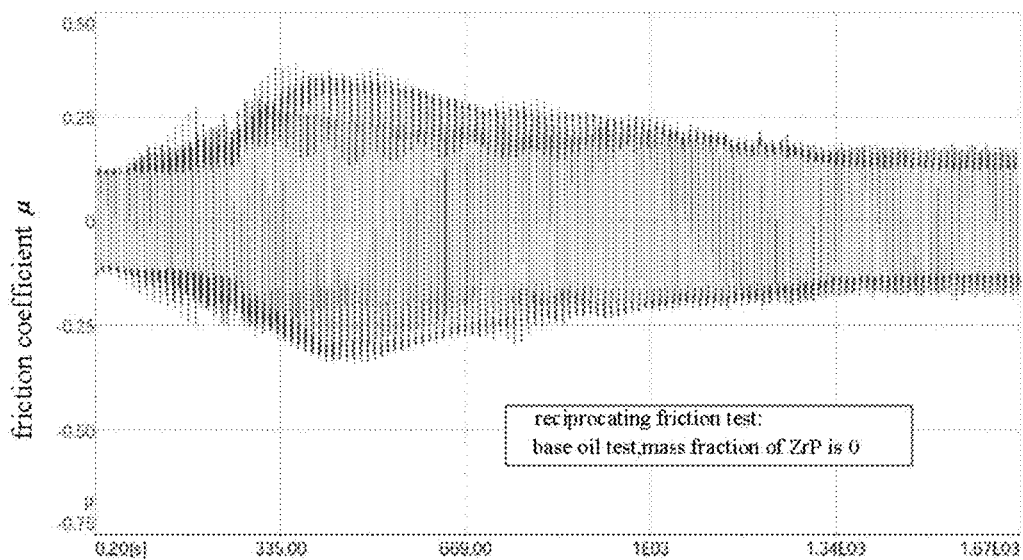
FIG. 11 is a diagram showing a test result of friction coefficient μ of lubricating oil when a mass fraction of ZrP is zero according to an embodiment of the present disclosure.
Figure 12:
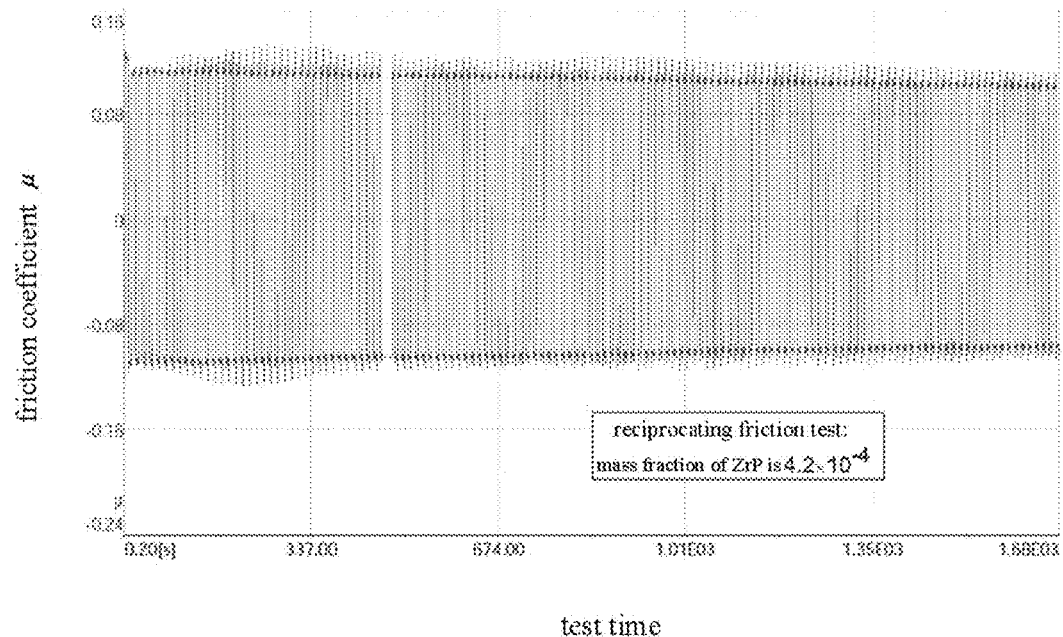
FIG. 12 is a diagram showing a time-friction coefficient curve of lubricating oil when a mass fraction of ZrP is $4.2 \times 10^{-4}$ according to an embodiment of the present disclosure.
Figure 13:
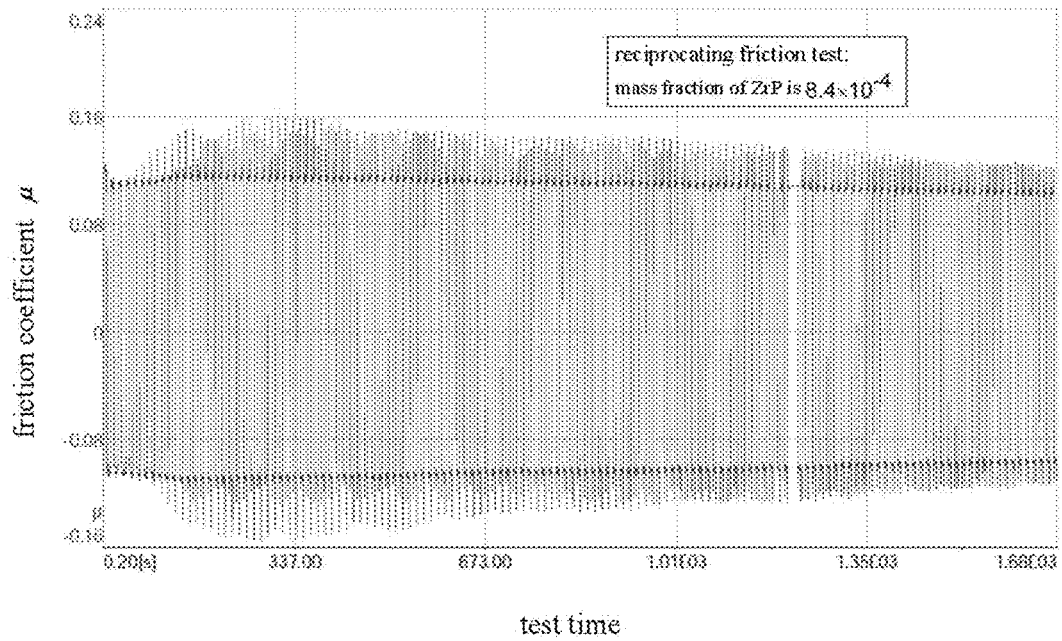
FIG. 13 is a diagram showing a time-friction coefficient curve of lubricating oil when a mass fraction of ZrP is $8.4 \times 10^{-4}$ according to an embodiment of the present disclosure.
Figure 14:
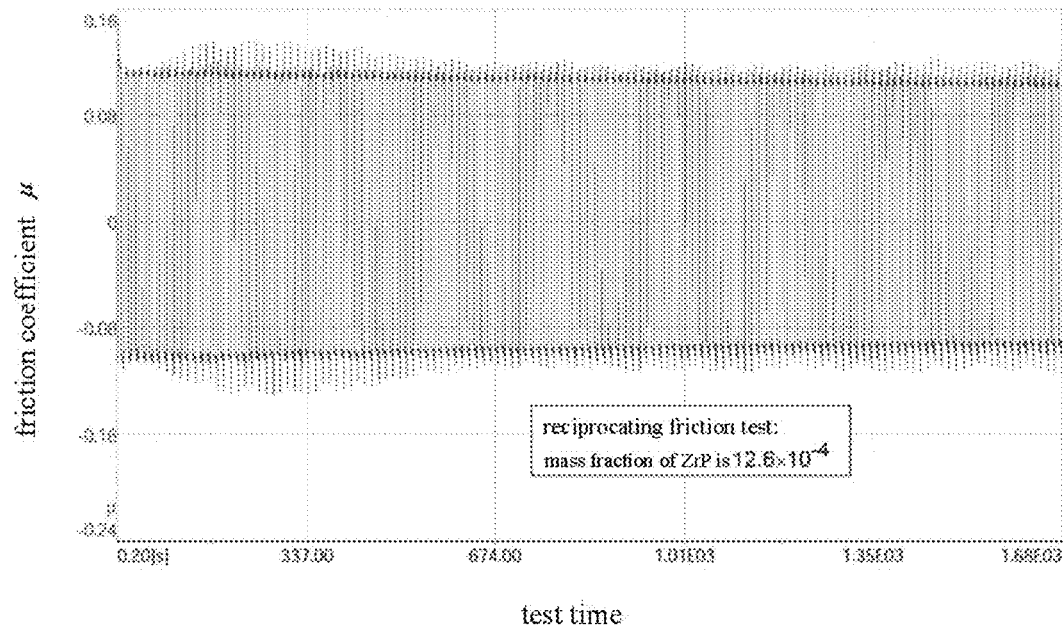
FIG. 14 is a diagram showing a time-friction coefficient curve of lubricating oil when a mass fraction of ZrP is $12.6 \times 10^{-4}$ according to an embodiment of the present disclosure.
Figure 15:
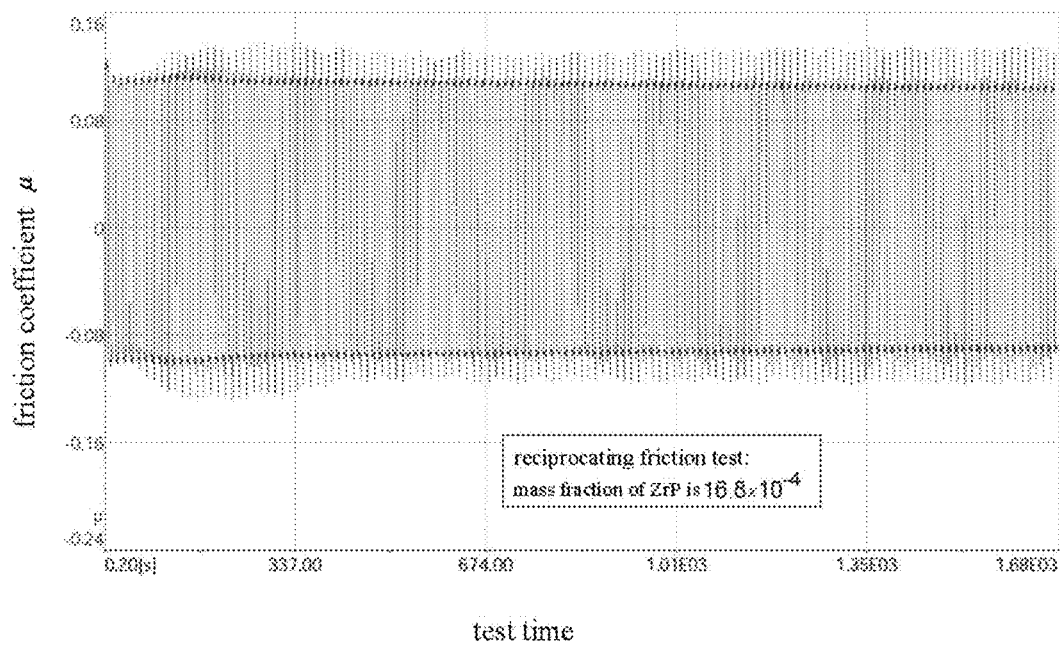
FIG. 15 is a diagram showing a time-friction coefficient curve of lubricating oil when a mass fraction of ZrP is $16.8 \times 10^{-4}$ according to an embodiment of the present disclosure.
Figure 16:
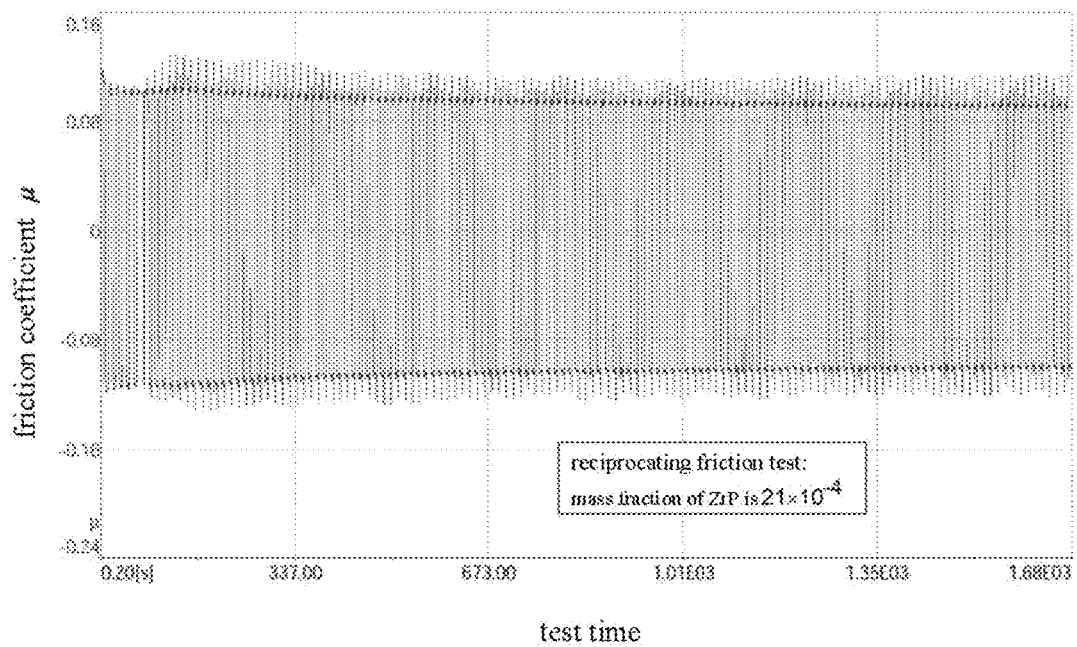
FIG. 16 is a diagram showing a time-friction coefficient curve of lubricating oil when a mass fraction of ZrP is $21 \times 10^{-4}$ according to an embodiment of the present disclosure.
Figure 17:
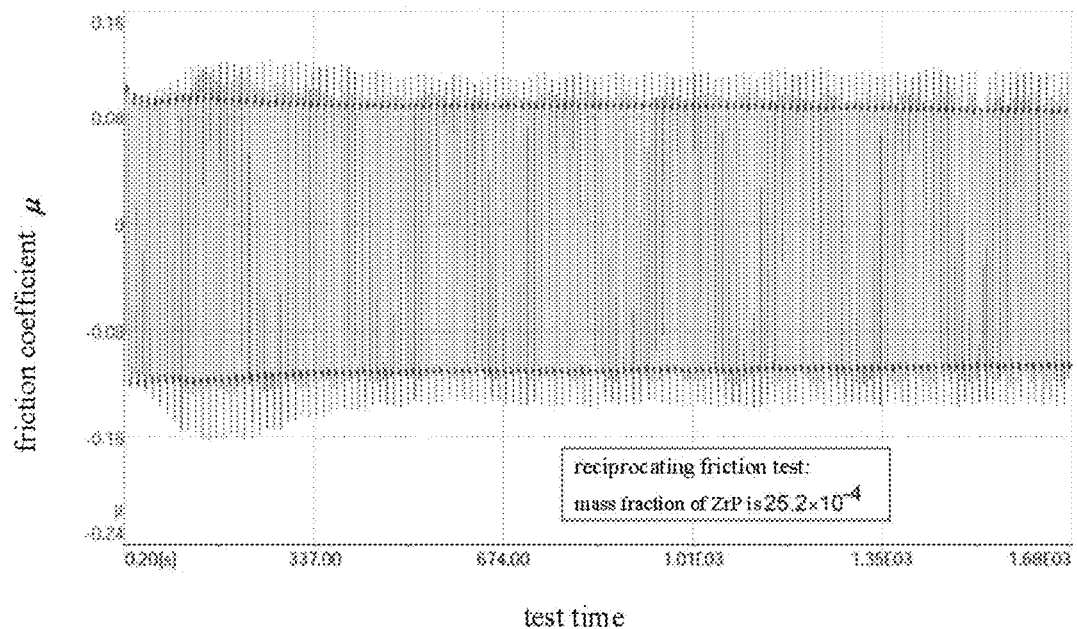
FIG. 17 is a diagram showing a time-friction coefficient curve of lubricating oil when a mass fraction of ZrP is $25.2 \times 10^{-4}$ according to an embodiment of the present disclosure.
Figure 18:
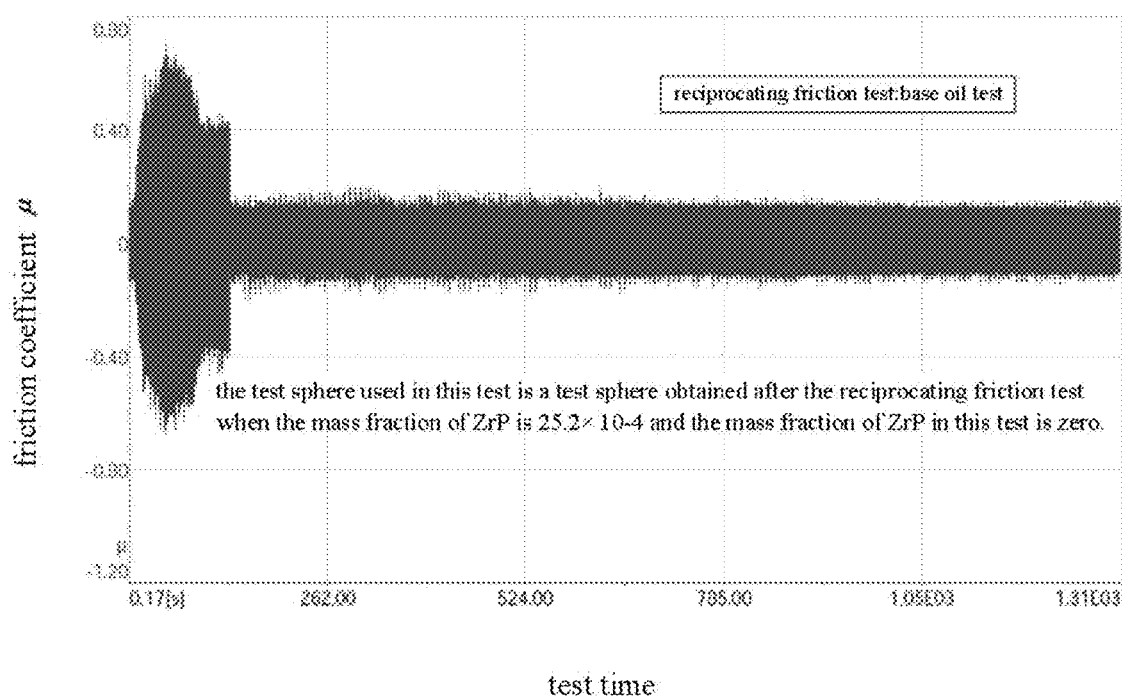
FIG. 18 is a diagram showing a time-friction coefficient curve of lubricating oil when a mass fraction of ZrP is zero according to an embodiment of the present disclosure, in which a test ball used in such a step is a test ball obtained after the friction test when a mass fraction of α-ZrP is $25.2 \times 10^{-4}$.

FIG. 11 is a diagram showing a test result of a friction coefficient μ of lubricating oil when a mass fraction of α-ZrP is zero. FIG. 12 is a diagram showing a time-friction curve of lubricating oil when a mass fraction of α-ZrP is 4.2×10$^{-4}$. FIG. 13 is a diagram showing a time-friction curve of lubricating oil when a mass fraction of α-ZrP is 8.4×10$^{-4}$. FIG. 14 is a diagram showing a time-friction curve of lubricating oil when a mass fraction of α-ZrP is 12.6×10$^{-4}$. FIG. 15 is a diagram showing a time-friction curve of lubricating oil when a mass fraction of α-ZrP is 16.8×10$^{-4}$. FIG. 16 is a diagram showing a time-friction curve of lubricating oil when a mass fraction of α-ZrP is 21×10$^{-4}$. FIG. 17 is a diagram showing a time-friction curve of lubricating oil when a mass fraction of α-ZrP is 25.2×10$^{-4}$. FIG. 18 is a diagram showing a time-friction curve of lubricating oil when a mass fraction of α-ZrP is zero, in which a test ball used in such a step is a test ball obtained after the friction test when a mass fraction of α-ZrP is 25.2×10⁻⁴. It can be seen from the test results of FIGS. 9-18, even if layered zirconium phosphate nanosheets and spherical nanoparticles of the present disclosure are in extremely low addition amount, they may be effectively used as abrasive resistance additives for lubricating oils and greases.

In the description of the present disclosure, it should be understood that terms such as "first" and "second" are used herein for purposes of description and are not intended to indicate or imply relative importance or significance. Thus, the feature defined with "first" and "second" may comprise one or more this feature. In the description of the present disclosure, unless specified otherwise, "a plurality of" means two or more than two.

Reference throughout this specification to "an embodiment", "some embodiments", "one embodiment", "another example", "an example", "a specific example", or "some examples", means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example", or "in some examples", in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for simultaneously and stably dispersing spherical nanoparticles in an oil medium by using layered nanosheets, comprising:
   mixing the layered nanosheets and oil-soluble alkylamines to obtain a first mixture where the layered nanosheets are intercalated/exfoliated with the oil-soluble alkylamines;
   mixing the spherical nanoparticles and the oil medium to obtain a second mixture; and
   mixing the first mixture, the second mixture and the oil medium to obtain a third mixture where the spherical nanoparticles and the layered nanosheets are stably dispersed;
   wherein the layered nanosheets are at least one selected from clays, layered double hydroxides, layered disulfide metal salts and layered tungsten acid metal salts.

2. The method according to claim 1, wherein the layered nanosheets and the oil-soluble alkylamines are mixed by means of heat treatment, ultrasonic treatment or mechanical agitation.

3. The method according to claim 1, wherein the layered nanosheets are of a particle size of 10 to 4000 nm.

4. The method according to claim 1, wherein the oil-soluble alkylamines are primary amines, secondary amines, tertiary amines or cyclic amines.

5. The method according to claim 1, wherein the oil-soluble alkylamines are Guerbet primary amines, aliphatic amines or poly-aliphatic amines.

6. The method according to claim 5, wherein the Guerbet primary amines have a structure as shown in formula 1:

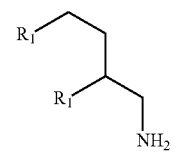

wherein $R_1$ is $C_{1-20}$ linear or branched hydrocarbyl.

7. The method according to claim 5, wherein the aliphatic amines have a structure as shown in formula 2:

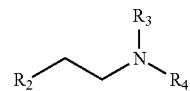

wherein $R_2$ is $C_{4-20}$ linear or branched hydrocarbyl; $R_3$ and $R_4$ each are independently —H, —CH₃, or —CH₂CH₃, preferably —H or —CH₃.

8. The method according to claim 7, wherein the aliphatic amines comprise unsaturated aliphatic primary amines containing C=C.

9. The method according to claim 8, wherein the aliphatic amines are at least one selected from a group consisting of the following primary amines: oleic amine, petroselinic amine, erucic amine, linoleic amine, linolenic amine, ricinoleic amine, 10-undecylenic amine, calendic amine, vernolic amine, santalbic amine, 5-eicosenoic amine, α-eleostearic amine, punicic amine, Hoffman degradation amine of oleic acid amide, Hoffman degradation amine of petroselinic acid amide, Hoffman degradation amine of erucic acid amide, Hoffman degradation amine of linoleic amide, Hoffman degradation amine of linolenic acid amide, Hoffman degradation amine of ricinoleic acid amide, Hoffman degradation amine of 10-undecylenic acid amide, Hoffman degradation amine of calendic acid amide, Hoffman degradation amine of vernolic acid amide, Hoffman degradation amine of santalbic acid amine, Hoffman degradation amine of 5-eicosenoic acid amide, Hoffman degradation amine of α-eleostearic acid amide, and Hoffman degradation amine of punicic acid amide.

10. The method according to claim 5, wherein the poly-aliphatic amines are homopolymers or copolymers of the unsaturated aliphatic primary amines containing C=C.

11. The method according to claim 1, wherein the spherical nanoparticles are at least one selected from a group consisting of metal oxide nanoparticles, metal nanoparticles and surface-oxidized metal nanoparticles.

12. The method according to claim 11, wherein the metal oxide nanoparticles are at least one selected from a group consisting of zinc oxide nanoparticles, aluminum oxide nanoparticles, copper oxide nanoparticles, nickel oxide nanoparticles, cobalt oxide nanoparticles, Fe₂O₃ nanoparticles, Fe₃O₄ nanoparticles, magnesium oxide nanoparticles, titanium oxide nanoparticles, zirconia nanoparticles, tungsten oxide nanoparticles, molybdenum oxide nanoparticles and tin oxide nanoparticles.

13. The method according to claim 11, wherein the metal nanoparticles are at least one selected from a group consisting of copper nanoparticles, iron nanoparticles, magnesium nanoparticles, aluminum nanoparticles, titanium nanoparticles, zirconium nanoparticles and tin nanoparticles.

14. The method according to claim 1, wherein the spherical nanoparticles have a particle size of 5 to 1000 nm.

15. The method according to claim 1, wherein in the third mixture,
   a molar ratio of the layered nanosheets to the oil-soluble alkylamines is 1:1 to 1:40; and
   a volume ratio of the layered nanosheets to the spherical nanoparticles is 1:0.001 to 1:10.

16. The method according to claim 15, wherein in the third mixture,
   the molar ratio of the layered nanosheets to the oil-soluble alkylamines is 1:1 to 1:25; and
   the volume ratio of the layered nanosheets to the spherical nanoparticles is 1:0.01 to 1:5.

17. An oil blend containing both layered nanosheets and spherical nanoparticles prepared by the method according to claim 1.

18. The method according to claim 3, wherein the layered nanosheets are of a particle size of 10 to 3000 nm.

19. The method according to claim 14, wherein the spherical nanoparticles have a particle size of 50 to 800 nm.

* * * * *